Nov. 30, 1971  V. T. D. WOOD  3,623,240

MODEL FOR AIRPORT RUNWAY LIGHTING

Filed April 28, 1970  3 Sheets-Sheet 1

Victor T. D. Wood
INVENTOR

BY Charles L. McGuire
ATTORNEY

Nov. 30, 1971 V. T. D. WOOD 3,623,240
MODEL FOR AIRPORT RUNWAY LIGHTING
Filed April 28, 1970 3 Sheets-Sheet 2
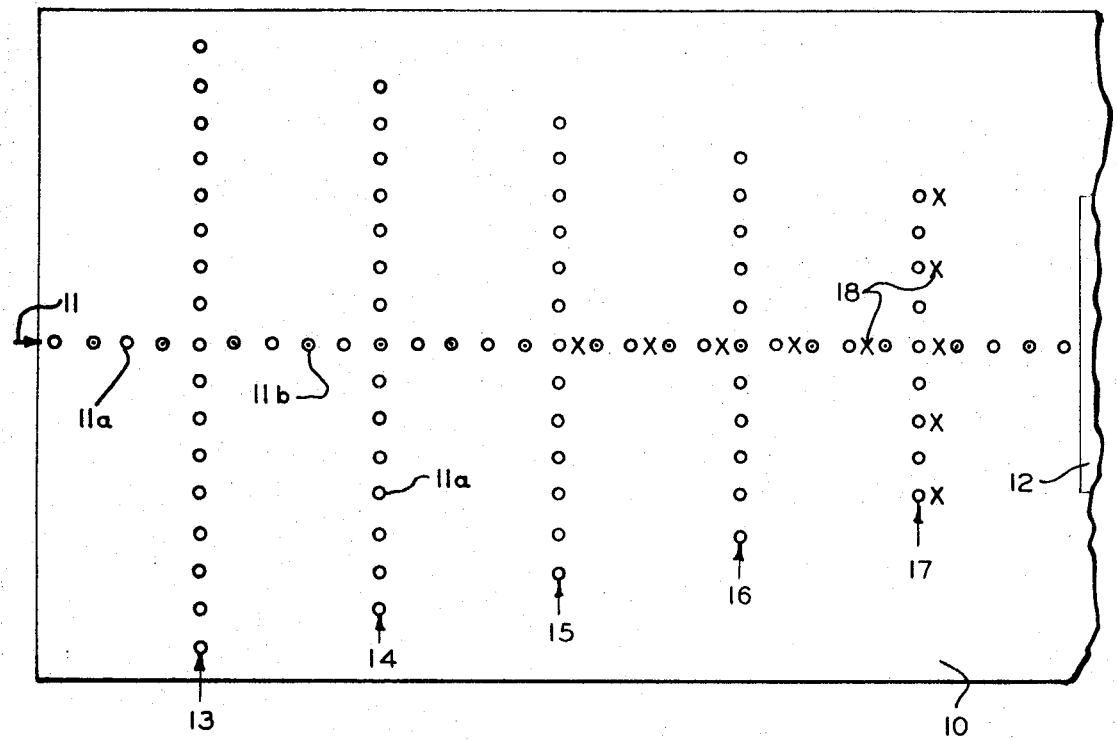
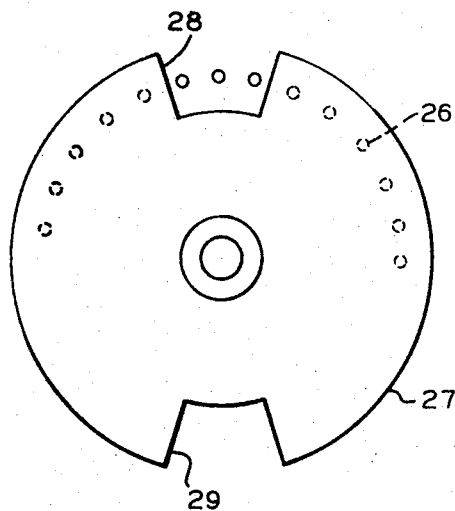
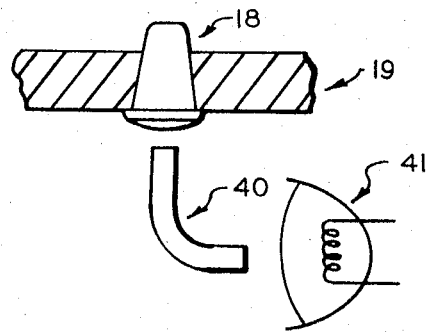
Victor T. D. Wood
INVENTOR.
BY Charles S. McGuire
ATTORNEY

United States Patent Office 3,623,240
Patented Nov. 30, 1971

3,623,240
MODEL FOR AIRPORT RUNWAY LIGHTING
Victor T. D. Wood, Goring-by-Sea, England, assignor to Singer-General Precision, Inc., Binghamton, N.Y.
Filed Apr. 28, 1970, Ser. No. 32,510
Int. Cl. B64g 7/00; G09b 9/08
U.S. Cl. 35—12 N
8 Claims

ABSTRACT OF THE DISCLOSURE

An arrangement for simulating, in reduced-scale model form, the approach lighting to an airfield runway. The problem of providing the necessary number of light-emitting members in realistic relationship, due to the greatly reduced scale of the model, is overcome by utilizing certain of the members to simulate more than one actual approach light. In the disclosed embodiment, certain of the light-transmitting members which represent the row of constant intensity lights extending from the center line of the runway also represent the strobe lights used under conditions of reduced visibility to indicate the direction of the runway center line. Means are provided for cooperatively adjusting the intensity of all the simulated lights to represent any desired level of visibility.

---

The present invention relates to runway approach lighting for terrain models and is particularly directed to an improved system for use in such models used in conjunction with training apparatus such as aircraft visual simulators.

Because of increased costs in operating aircraft, the use of visual simulation systems is fixed base training devices has steadily increased. This is particularly true in the area of takeoff and landing training. Among the most common of such visual simulation systems are those employing a motion picture display of a filmed sequence of takeoff or landing, and terrain model systems containing an airfield with suitable viewing means to simulate relative motion of the training device and the model which appears to the trainee as a simulated real world scene. These two systems may also be combined since the terrain model may be used rather than actual terrain, in filming a training sequence for later display.

In training for landing of aircraft it is often desirable to simulate various approach lighting configurations and varying conditions of visibility. To provide this with filmed sequences requires a considerable amount of time and expense since many separate films must be made to cover all the desired conditions. A terrain model with an approach lighting system having the desired flexibility avoids these problems and allows training under different conditions at minimum expense.

Runway approach lighting typically extends over a distance of 1000 yards to the threshold of the runway and may contain three distinct lighting arrangements. One of these comprises a row of white, unidirectional, high-intensity lights extending from the centerline of the runway, with from two to five rows of the same type of lights perpendicular to the center row in the nature of cross bars. The center row may be a double row for the first 500 feet from the runway. The cross bars are of varying length growing shorter as the threshold is approached. The second arrangement known as a T-bar consists of a plurality of red, low-intensity, omnidirectional lights arranged in the shape of a T with the lights in the stem of the T interspersed between the centerline white lights and the lights in the cross bar of the T adjacent to the cross bar row of white lights nearest the runway.

The third arrangement is an array of strobe lights. These consist of a chain of discharge lamps, such as Xenon flashtubes, arranged adjacent to the row of centerline lights. Under conditions of reduced visibility, the strobe lights are illuminated sequently from the end furthest from the runway toward the runway, providing an apparently moving flash of light to the pilot indicating the direction of the runway. The sequential flashing is repeated at a rate of about two cycles per second.

In practice, the three types of lights which are located on the centerline are mounted in clusters on common supporting posts. This results in all the lights appearing to be on the centerline when viewed from the air in the real world. It is possible in the real world to mount these three lights in a vertical line on the post, to group them closely horizontally or to use some combination. In any of these arrangements the angular subtense between the lights, as viewed from the air, is negligible. In attempting to make a model of this system, the great reduction in scale makes it difficult to arrange the simulated lights closely enough so that they appear to be in the correct proximity and to be along the centerline when viewed from a simulated aircraft. Attempts using independent light sources utilizing miniature lamps and those using separate light pipes extending through the base of the model have failed to attain the objective. Using the smallest light emitting device which will provide the required light and placing it next to another of the same type will result in an angular subtense between the two much in excess of that in the real world. For example, twelve-inch spacing in the real world would require model spacing, on a 2000:1 model, of six thousandths of an inch and hence light emitting devices of the same size. Obviously this cannot be done using separate devices. The problem becomes even more acute when greater reductions in scale are made.

The principal object of the present invention is to provide a terrain model with an improved system of runway approach lighting allowing presentation of any normal approach lighting configuration under all conditions of visibility with all lights appearing to be in the desired degree of proximity.

An additional object is to provide a camera model visual simulation system with greatly expanded versatility with regard to the manner of representing approach lighting under various conditions of visibility.

Other objects of this invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 2 is a plan view of a model containing the invention;

FIG. 3a is partial sectional elevation view of the model, schematically showing additional lighting means; and FIG. 4 is a sectional view along the line 4—4 of FIG. 3.

Figure 1:
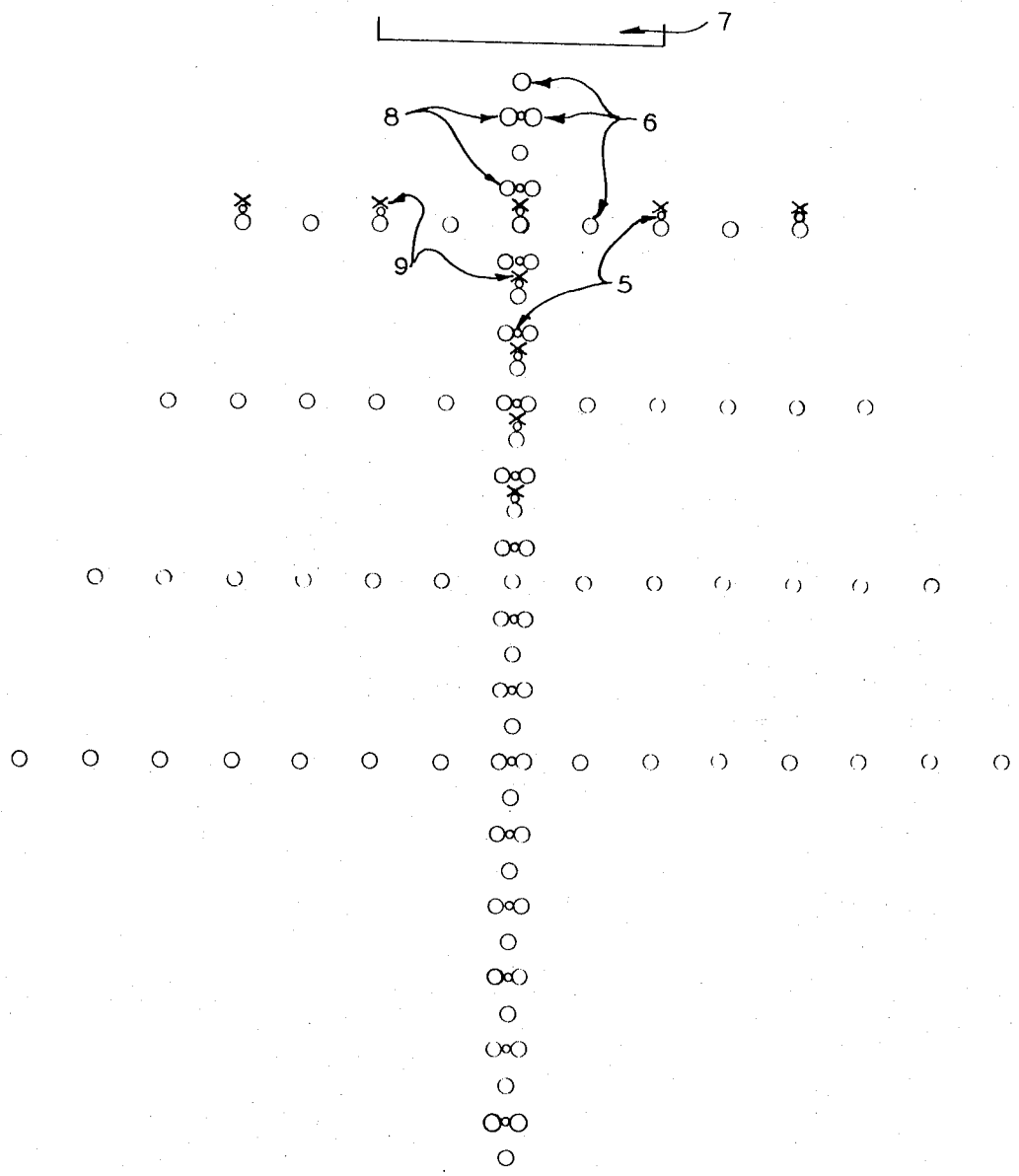
FIG. 1 is a plan view of a real world approach lighting system.

In FIG. 1 a typical real world airport approach lighting system, with a center row of white, unidirectional, high-intensity lights 6, strobe lights 8, and the stem of red, omnidirectional, T-bar lights 9 extending from the center of the runway 7, is shown. As shown a strobe light 8 is located adjacent to and on the same post 5 as every other white, high-intensity, unidirectional light in the center row. Cross rows of white, high-intensity, unidirectional lights 6 are shown located every fifth light along the center row and the number of lights in each successive row decreases by 2 as the runway threshold is approached. The cross row of the red, omnidirectional, T-bar lights 9 are shown adjacent to the last row of white lights 6 and on the same post 5 with the white lights.

FIG. 2 shows a model 10 containing the invention. A center row 11 of which light emitting members 11a, representing white, high-intensity, unidirectional lights, and 11b, representing, in a manner to be described later, both the white, high-intensity, unidirectional lights and the strobe lights, thus avoiding the problem of installing two members in the desired close proximity, is shown extending from the centerline of the runway. The cross rows 13, 14, 15, 16, and 17, consisting of additional light emitting members 11a are shown perpendicular to the center row 11 and are located at every fifth light 11a or 11b in the center row. Representing the T-bar lights are a plurality of red light emitting members 18 arranged along the center row and adjacent to the last row 17 of white light emitting members.

Figure 3:
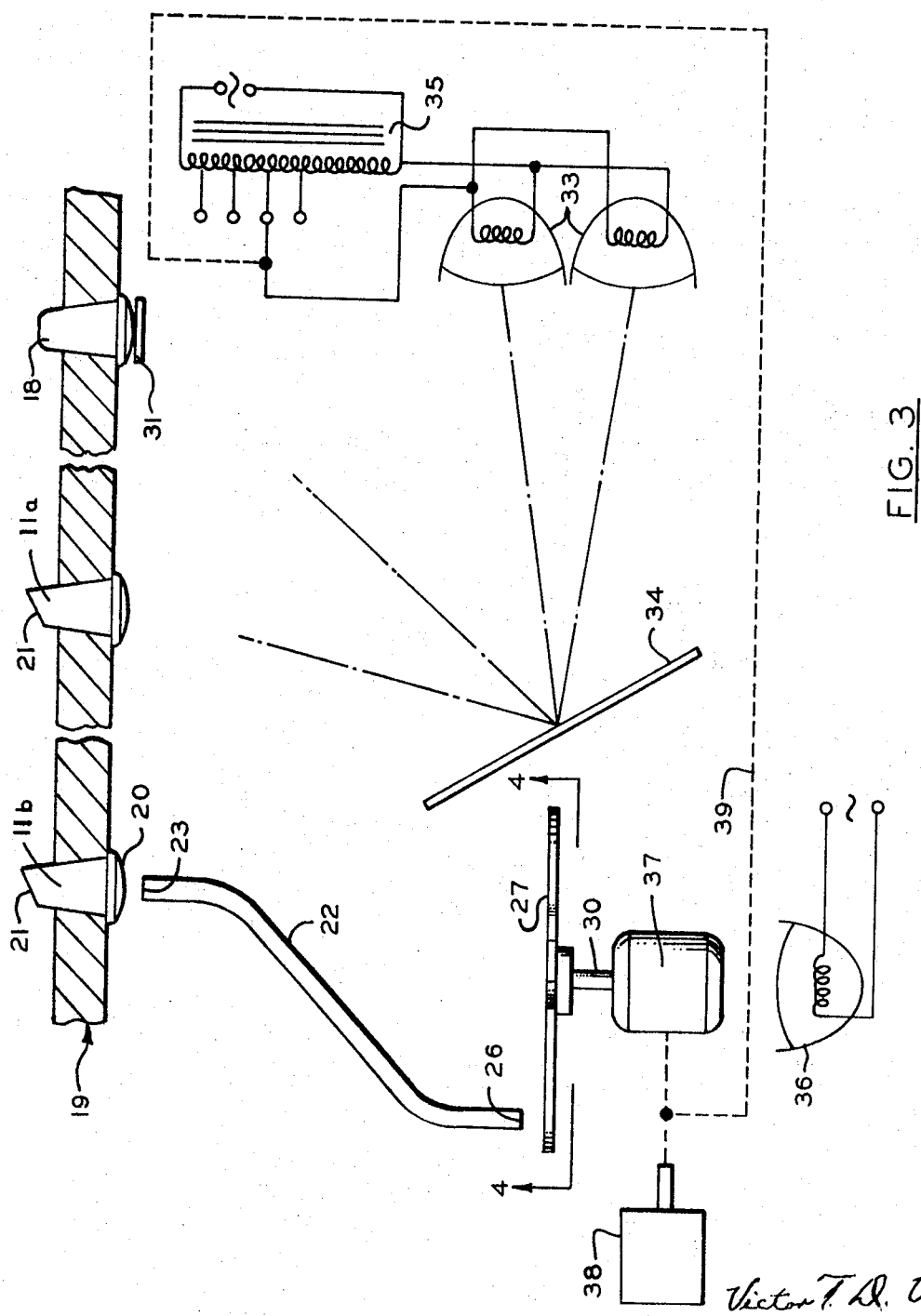
FIG. 3 is an elevational view, partially in section, of the model containing the invention, schematically showing lighting and control means.

FIG. 3 shows the base 19 of the model 10 comprising a solid opaque sheet or layer of some material (e.g., plywood, hardboard, rubber). The light emitting members 11a, 11b and 18 are pushed into apertures in the base 19 and are secured with a suitable adhesive means. The light emitting members 11a and 11b are made of a clear translucent material with a surface 21 on the viewing side of the model shaped to provide unidirectional light and a lens 20 on the bottom to collect light. Light emitting members 18 are similar but have a domed top to provide omnidirectional light and are of a red color. All of these light emitting members 11a, 11b and 18 may be made of any suitable transparent or translucent material such as plastic or glass. The sides of light emitting members 11a, and 11b, i.e., portions other than surface 21 which provides the unidirectional transmission, may be coated with opaque paint to avoid omnidirectional light loss. Located on the side of the model not being viewed, i.e., below or adjacent to the model, are means for providing and controlling the light input to the light emitting members. In the embodiment shown, light for light emitting members 11a is provided by the output of lamps 33 reflected from mirror 34. Lamps 33 may be of the xenon arc type or any other lamp which will provide the desired amount of light output. Mirror 34 must be of a size and in a position sufficient to reflect light on the whole area encompassed by the light emitting member arrays. This same lamp 33 may provide light to light emitting members 18 with a reduction in intensity through filter 31; alternatively, the light for light emitting members 18 may be provided from a separate light source lamp 41 via light pipes 40 as shown in FIG. 3a. This second method allows independent control of the intensity of the light emitting members 18 representing the T-bar lights.

Light for light emitting members 11b is transmitted via light pipes 22 consisting of conventional fiber optics bundles, each having a light collecting end 26 located near the source and a light emitting end 23 located adjacent to lens 20 of the associated light emitting member 11b. Filter wheel 27, mounted on shaft 30 of motor 37, may be interposed between the light source, lamp 36, for light emitting members 11b and the light collecting ends 26 of their associated light pipes 22. The whole filter wheel assembly, including filter 27, motor 37 and shaft 30, may be withdrawn from the light path by actuation of solenoid 38. the arrangement of the collecting ends 26 of light pipes 22 in relation to the filter wheel 27 when interposed is shown in FIG. 4. The light collecting ends are arranged in a semicircle of slightly less than 180°.

When operating the system under simulated conditions of good visibility, solenoid 38 will be energized, thus removing filter wheel 27, motor 37 and shaft 30 from the light path. Lamp 36 will be adjusted to obtain the desired light intensity from light emitting members 11b. The intensity of the light from light emitting members 11a will then be adjusted until it is equal to that of the light from light emitting members 11b by changing the setting of auto transformer 35 to obtain the proper light levels from lamps 33. This will result in the whole array of light emitting members 11a and 11b having an equal intensity.

When it is desired to simulate conditions of low visibility, at which time strobe lights would be in use, the solenoid 38 is de-energized and the filter 27 interposed in the light path. The filter 27, as shown in FIG. 4 is made of a translucent material of a nature which will reduce the transmission of light from lamp 36 through light pipes 22 to light emitting members 11b and has two window sections 28 and 29 which are clear and allow full transmission of light. The filter 27 may be made of clear glass on which a photographic emulsion was deposited, exposed and developed while windows 28 and 29 were masked or may be made by selective etching, fogging or painting of the glass. Alternatively any translucent material with reduced transmission may be used with the window areas either kept clear by masking, or cutouts of the window areas made. With the translucent portion of filter 27 interposed between lamp 36 and the light collecting ends of light pipes 22, the intensity of the light emitted from members 11b will be reduced, representing reduced visibility. The intensity of light emitted by members 11a may then be adjusted by changing the setting of auto transformer 35 to reduce the voltage on lamps 33. This may be done manually or the transformer setting may be automatically changed by solenoid 38 through a suitable mechanical linkage, schematically indicated by dotted line 39, or by other automatic means.

As was previously indicated, light emitting members 11b represent both the white, high-intensity, unidirectional lights and the strobe lights. During simulation of good visibility conditions they represent only the former. But here, where conditions of low visibility are being simulated, with the filter interposed they represent both. When the window portions 28 and 29 of the filter are between the lamp 36 and light pipes 22 the light emitting devices 11b will emit light at a high intensity and appear as strobe lights. With the low transmission portion of filter 27 in place, i.e., portion other than the window, light emitting members 11b will appear as white, high-intensity, lights under reduced visibility conditions matching the other light emitting members 11b representing white, high-intensity lights. Because the strobe light has a much higher intensity than the white, high-intensity light in the real world, only the strobe light would be visible under actual conditions. Hence the lack of two adjacent center rows of light emitting members, one representing the strobe lights and one representing the high-intensity lights, will not detract from the simulation. In the embodiment shown the effect of the strobe lights moving toward the runway is accomplished by rotating motor 37, a synchronous motor, at 60 r.p.m. causing a window 27 or 28 to pass over the light collecting ends 26 of light pipes 22 twice a second which will in turn cause a sequential increase in the intensity of light emitted from light emitting members 11b simultating the desired effect. As the filter is rotated three light emitting members 11b will be illuminated at high intensity and the light will move in a cyclic sequence from the remote end of row 11 to the threshold end. During this time all other lights will be at reduced intensity and the appearance of strobe lights during low visibility conditions will be simulated.

The strobe light action may also be simulated using a rotating mirror to sequentially provide the light to the light pipes 22 or by any other suitable means of sequentially providing light to the light pipes.

What is claimed is:

1. A model of an airfield runway approach lighting system comprising:
   (a) a substantially opaque sheet having an upper surface representing the airfield runway approach surface;
   (b) a plurality of light transmitting members extending through said sheet to conduct light from beneath to above said sheet and arranged in a substantially straight row extending from the centerline of said runway model;
   (c) at least one light source arranged to direct light from beneath said sheet toward said light transmitting members; and
   (d) means constructed and arranged to momentarily increase, from a first to a second level, the intensity of light directed from said source to selected ones of said light transmitting members in a predetermined sequence, while maintaining said first level of intensity of light directed to the light transmitting members of said row other than said selected ones.

2. The invention according to claim 1 wherein said level of intensity is momentarily increased in sequence from the light transmitting member of said selected ones most remote from said runway approach surface along said row to the light transmitting member of said selected ones nearest said runway approach surface.

3. The invention according to claim 2 wherein said means for momentarily increasing said intensity comprises a filter having areas of different light transmission and means for interposing said different areas in the path of light from said source sequentially to each of said selected ones of said light transmitting members.

4. The invention according to claim 3 and further including a plurality of light pipes having light-collecting ends arranged to receive light from said source, through said filter, and light-emitting ends arranged to direct light through said selected ones of said light transmitting members.

5. The invention according to claim 4 wherein a first light source is arranged to direct light to said light-collecting ends of said light pipes and a second, separate light source is arranged to direct light to the light transmitting members of said row other than said selected ones.

6. The invention according to claim 5 wherein said filter comprises a rotatable disc and said light-collecting ends are arranged in an arcuate pattern, disposed toward said disc at substantially equal distances from the center thereof.

7. The invention according to claim 6 wherein means are provided for selectively removing said filter from the path of light from said first light source and said light collecting ends of said light pipes.

8. The invention according to claim 7 and further including means for automatically increasing the intensity of light output from said second light source in response to operation of said means for selectively removing said filter.

References Cited
UNITED STATES PATENTS

| | | | |
|---|---|---|---|
| 2,979,832 | 4/1961 | Klemperer | 35—12 N |
| 3,158,834 | 11/1964 | Evans | 340—26 |
| 3,152,316 | 10/1964 | Baxter et al. | 340—26 |
| 3,117,299 | 1/1964 | Lemm et al. | 340—26 |
| 2,794,967 | 6/1957 | Coggins et al. | 340—26 |

ROBERT W. MICHELL, Primary Examiner

L. R. OREMLAND, Assistant Examiner

U.S. Cl. X.R.

35—10.2